US011827062B2

(12) United States Patent
Van Riper et al.

(10) Patent No.: US 11,827,062 B2
(45) Date of Patent: Nov. 28, 2023

(54) NON-PNEUMATIC TIRE WITH A FLEXIBLE LOOPED SPOKE AND METHOD OF FORMING

(71) Applicant: The Goodyear Tire & Rubber Company, Akron, OH (US)

(72) Inventors: Philip Carl Van Riper, Cuyahoga Falls, OH (US); Michael Joseph Durr, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 447 days.

(21) Appl. No.: 16/984,364

(22) Filed: Aug. 4, 2020

(65) Prior Publication Data
US 2021/0061010 A1   Mar. 4, 2021

Related U.S. Application Data

(60) Provisional application No. 62/893,557, filed on Aug. 29, 2019, provisional application No. 62/893,652, filed on Aug. 29, 2019.

(51) Int. Cl.
*B60C 7/18* (2006.01)
*B29D 30/02* (2006.01)
(Continued)

(52) U.S. Cl.
CPC ............... *B60C 7/18* (2013.01); *B29D 30/02* (2013.01); *B60C 7/146* (2021.08); *B60C 7/22* (2013.01)

(58) Field of Classification Search
CPC ........... B60C 7/146; B60C 7/18; B60C 7/102; B60C 7/26; B60C 7/22; B29D 30/02
See application file for complete search history.

(56) References Cited

U.S. PATENT DOCUMENTS

| 10,040,317 | B2 | 8/2018 | Celik | |
| 2012/0205017 | A1* | 8/2012 | Endicott | ................ B60B 21/06 |
| | | | | 152/1 |

(Continued)

FOREIGN PATENT DOCUMENTS

| KR | 20130063254 A | * | 6/2013 | |
| WO | WO-2017116804 A1 | * | 7/2017 | ....... B29C 45/14065 |

(Continued)

OTHER PUBLICATIONS

European Search Report for Serial No. EP20192622 dated Nov. 27, 2020.

*Primary Examiner* — Kip T Kotter
(74) *Attorney, Agent, or Firm* — June E. Rickey

(57) ABSTRACT

A nonpneumatic tire has at least one spoke loop structure connected to a shear band, wherein the spoke loop structure has a plurality of loops extending inward from the shear band, and wherein each loop is connected to a wheel. A method for forming the nonpneumatic tire includes the step of forming a base and loop subassembly by providing a base having a plurality of grooves, inserting a layer of elastomer strip into each groove and forming a loop between each of the grooves; and inserting the base and loop subassembly which has a plurality of flexible loops extending inward from a shearband so that the base is positioned adjacent the shear band; curing the base and loop subassembly formed from a strip of elastomeric material into the shearband; providing a wheel, and then connecting each loop to the wheel.

22 Claims, 18 Drawing Sheets

(51) Int. Cl.
  *B60C 7/14*   (2006.01)
  *B60C 7/22*   (2006.01)

(56) References Cited

U.S. PATENT DOCUMENTS

| | | | |
|---|---|---|---|
| 2016/0016426 A1 | | 1/2016 | Endicott |
| 2016/0214435 A1 | * | 7/2016 | Schaedler ................. B60C 7/10 |
| 2018/0170107 A1 | * | 6/2018 | Costlow .................... B60C 7/18 |
| 2018/0354316 A1 | * | 12/2018 | Celik ..................... B29D 30/02 |
| 2019/0047328 A1 | | 2/2019 | Rivers et al. |
| 2019/0126673 A1 | | 5/2019 | Celik et al. |
| 2020/0047555 A1 | | 2/2020 | Costlow et al. |

FOREIGN PATENT DOCUMENTS

| | | | | |
|---|---|---|---|---|
| WO | WO-2017117599 A1 | * | 7/2017 | ............ B29D 30/02 |
| WO | 20180115940 A1 | | 6/2018 | |
| WO | 2018200142 A1 | | 11/2018 | |

* cited by examiner

NON-PNEUMATIC TIRE WITH A FLEXIBLE LOOPED SPOKE AND METHOD OF FORMING

FIELD OF THE INVENTION

The present invention relates generally to vehicle tires and non-pneumatic tires, and more particularly, to a non-pneumatic tire and method of making.

BACKGROUND OF THE INVENTION

The pneumatic tire has been the solution of choice for vehicular mobility for over a century. The pneumatic tire is a tensile structure. The pneumatic tire has at least four characteristics that make the pneumatic tire so dominate today. Pneumatic tires are efficient at carrying loads, because all of the tire structure is involved in carrying the load. Pneumatic tires are also desirable because they have low contact pressure, resulting in lower wear on roads due to the distribution of the load of the vehicle. Pneumatic tires also have low stiffness, which ensures a comfortable ride in a vehicle. The primary drawback to a pneumatic tire is that it requires compressed fluid. A conventional pneumatic tire is rendered useless after a complete loss of inflation pressure.

A tire designed to operate without inflation pressure may eliminate many of the problems and compromises associated with a pneumatic tire. Neither pressure maintenance nor pressure monitoring is required. Structurally supported tires such as solid tires or other elastomeric structures to date have not provided the levels of performance required from a conventional pneumatic tire. A structurally supported tire solution that delivers pneumatic tire-like performance would be a desirous improvement.

Non pneumatic tires are typically defined by their load carrying efficiency. "Bottom loaders" are essentially rigid structures that carry a majority of the load in the portion of the structure below the hub. "Top loaders" are designed so that all of the structure is involved in carrying the load. Top loaders thus have a higher load carrying efficiency than bottom loaders, allowing a design that has less mass.

Thus, an improved non pneumatic tire is desired that has all the features of the pneumatic tires without the drawback of the need for air inflation.

BRIEF DESCRIPTION OF THE DRAWINGS

The present invention will be better understood through reference to the following description and the appended drawings, in which:

FIG. 8A is a front view of an alternate embodiment of a spoke loop structure having a single set of loops, shear band and tread ring assembly of the present invention, while

FIG. 10A illustrates a perspective view of a strip of elastomer with parallel reinforcement cords while FIG. 10D illustrates a first set of reinforcement cords oriented in a first angular orientation and a second set of reinforcement cords oriented in a second angular orientation; FIG. 10E illustrates pre-tensioning of one spoke 420 with pin 510;

FIG. 13A illustrates a front view of a portion of the base and spoke loop structure, while

DEFINITIONS

The following terms are defined as follows for this description.

"Equatorial Plane" means a plane perpendicular to the axis of rotation of the tire passing through the centerline of the tire.

"Meridian Plane" means a plane parallel to the axis of rotation of the tire and extending radially outward from said axis.

"Hysteresis" means the dynamic loss tangent measured at 10 percent dynamic shear strain and at 25° C.

DETAILED DESCRIPTION OF THE INVENTION

Figure 1:
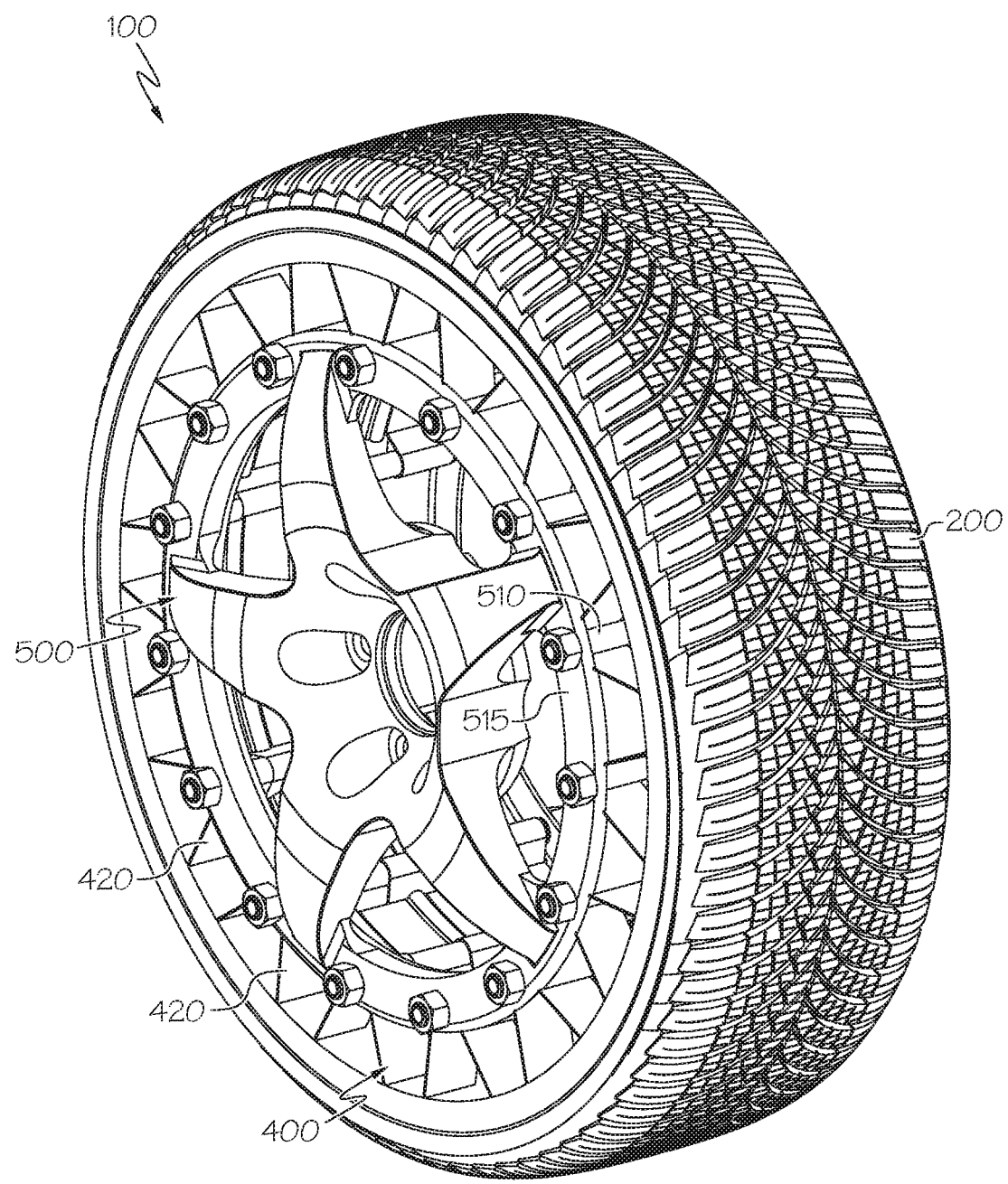
FIG. 1 is a perspective view of a first embodiment of a non-pneumatic tire of the present invention.

The non-pneumatic tire 100 of the present invention is shown in FIG. 1. The nonpneumatic tire of the present invention includes a radially outer ground engaging tread 200, a shear band 300, and one or more spoke loop structures 400. The non-pneumatic tire of the present invention is designed to be a top loading structure, so that the shear band 300 and the one or more spoke loop structures 400 efficiently carry the load. The shear band 300 and the spoke loop structures 400 are designed so that the stiffness of the shear band is directly related to the spring rate of the tire. The spoke loops 420 of each spoke loop structures are designed to be stiff structures that buckle or deform in the tire footprint yet are unable to compress or carry a compressive load. This allows the rest of the loops not in the footprint area the ability to carry the load. Since there are more loops outside of the footprint than inside the footprint, the load per loop would be small enabling smaller loops to carry the tire load which gives a very load efficient structure. It is desired to minimize this compressive load on the spokes for the reason above and to allow the shearband to bend to overcome road obstacles. The approximate load distribution is such that approximately 90-100% of the load is carried by the shear band and the upper spokes, so that the lower spokes carry virtually zero of the load, and preferably less than 10%.

The tread portion 200 may have no grooves or may have a plurality of longitudinally oriented tread grooves forming essentially longitudinal tread ribs there between. Ribs may be further divided transversely or longitudinally to form a tread pattern adapted to the usage requirements of the particular vehicle application. Tread grooves may have any depth consistent with the intended use of the tire. The tire tread 200 may include elements such as ribs, blocks, lugs, grooves, and sipes as desired to improve the performance of the tire in various conditions.

Shear Band

Figure 9:
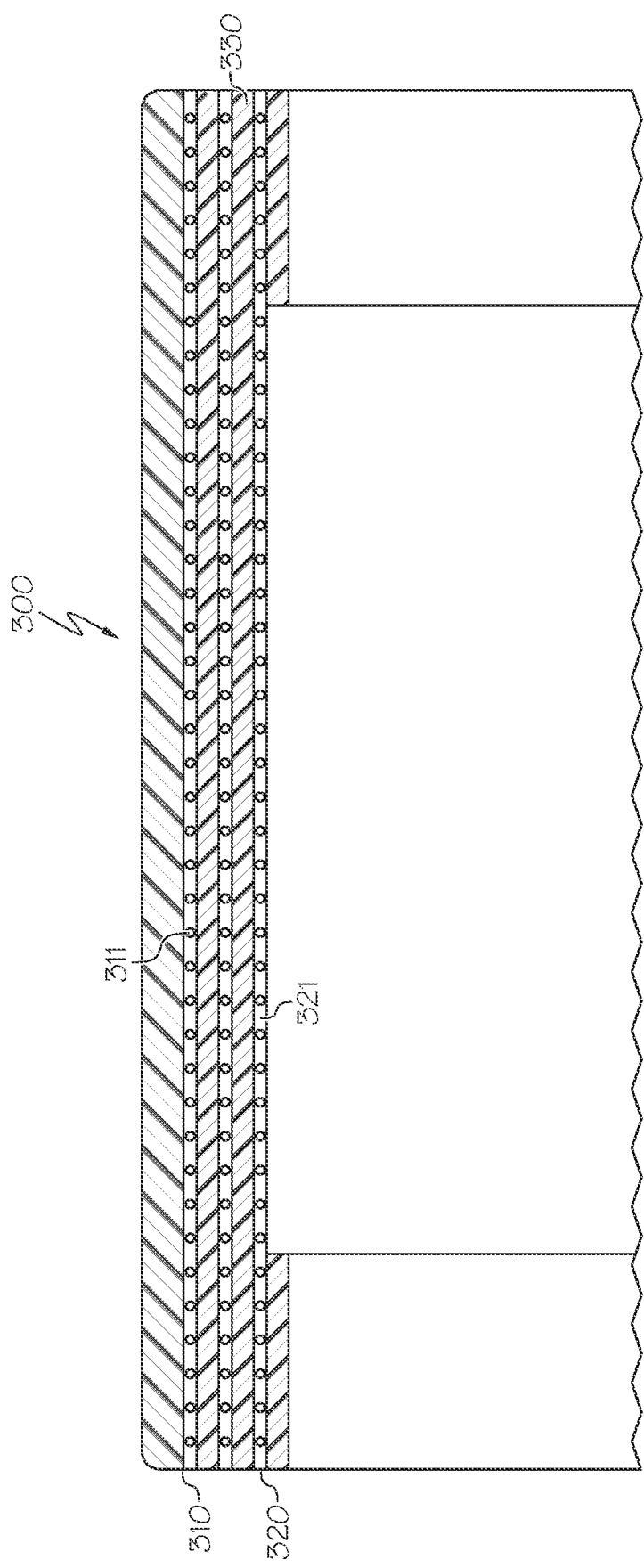
FIG. 9 is a cross-sectional view of the shearband.
Figure 10A:
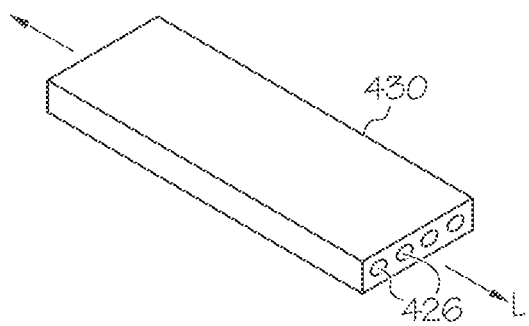
Figure 10B:
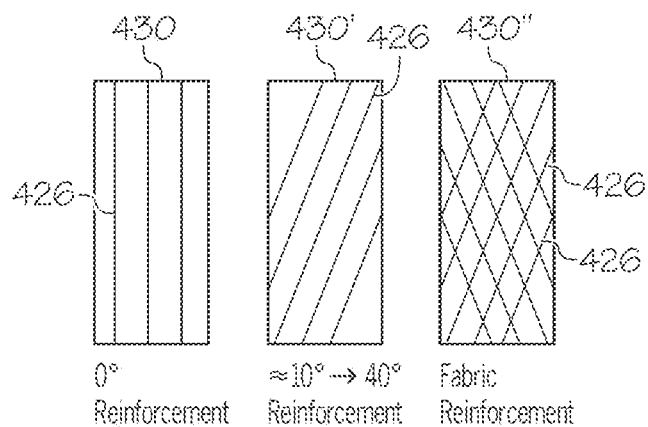
FIG. 10B illustrates parallel reinforcement cords for the strip of elastomer.
Figure 10C:
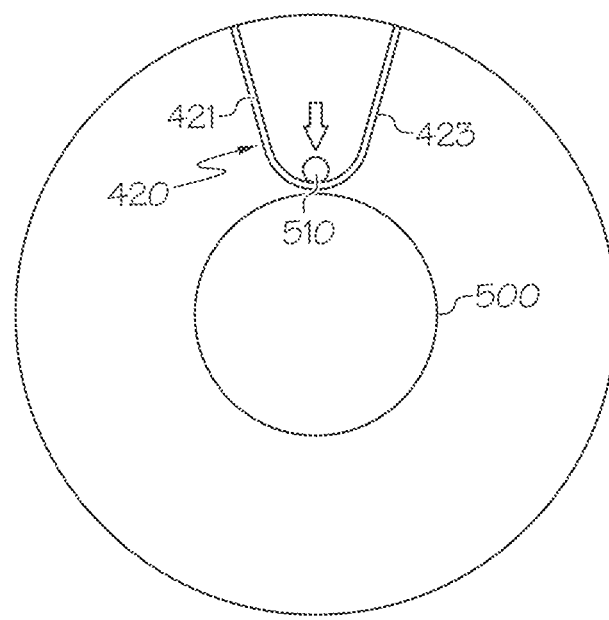
FIG. 10C illustrates the reinforcement cords for the strip arranged in an angled orientation, relative to a zero degree orientation as shown in FIG. 10B.
Figure 11A:
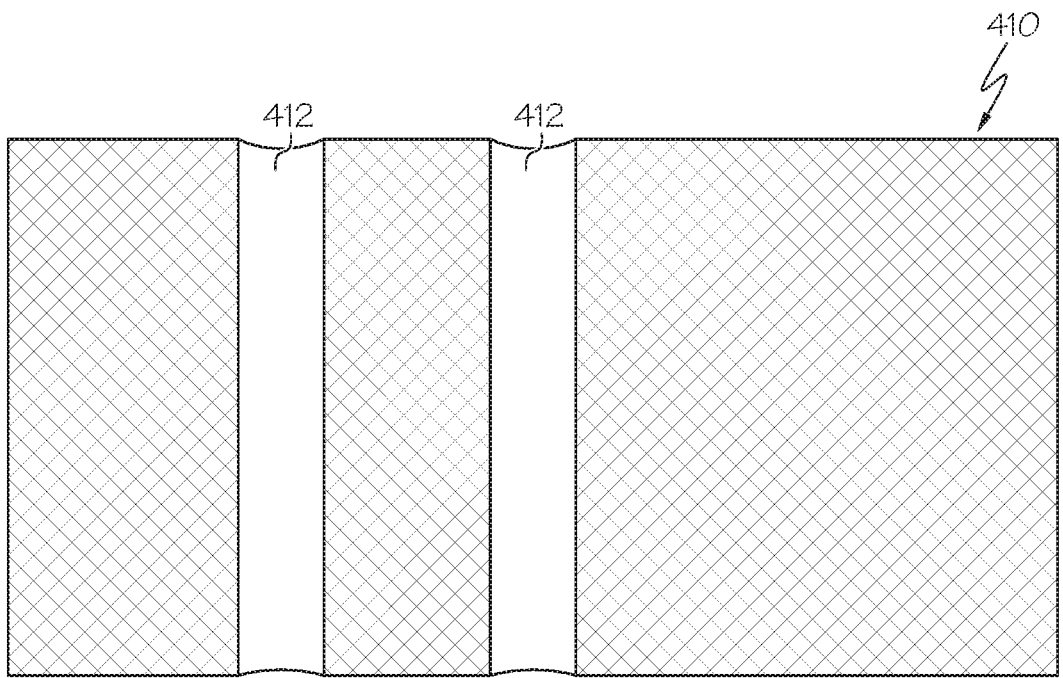
FIG. 11A illustrates a top view of the base of the spoke loop structure.
Figure 11B:
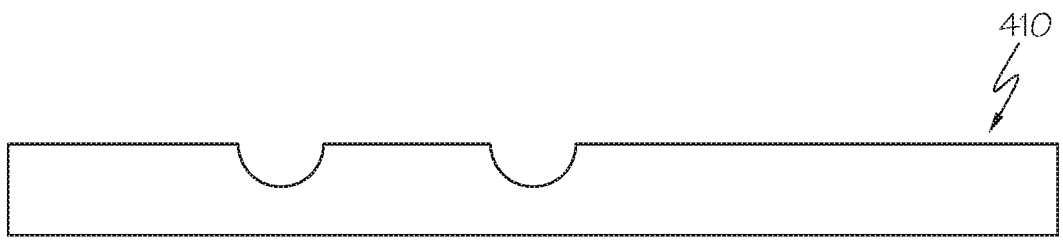
FIG. 11B illustrates a side view of the base of FIG. 11A.

The shear band 300 is preferably annular, and is shown in cross-section in FIG. 9. The shear band 300 is located radially inward of the tire tread 200. The shear band 300 includes a first and second reinforced elastomer layer 310, 320. In a first embodiment of a shear band 300, the shear band is comprised of two inextensible layers arranged in parallel, and separated by a shear matrix 330 of elastomer. Each inextensible layer 310,320 may be formed of parallel inextensible reinforcement cords 311,321 embedded in an elastomeric coating. The reinforcement cords 311,321 may be steel, aramid, or other inextensible structure. In a second embodiment of the shear band, the shear band 300 further includes a third reinforced elastomer layer located between the first and second reinforced elastomer layers 310,320.

In the first reinforced elastomer layer 310, the reinforcement cords 311 are oriented at an angle $\Phi$ in the range of 0 to about +/−10 degrees relative to the tire equatorial plane. In the second reinforced elastomer layer 320, the reinforcement cords 321 are oriented at an angle $\varphi$ in the range of 0 to about +/−10 degrees relative to the tire equatorial plane. Preferably, the angle $\Phi$ of the first layer is in the opposite direction of the angle $\varphi$ of the reinforcement cords in the second layer. That is, an angle+$\Phi$ in the first reinforced elastomeric layer and an angle−$\varphi$ in the second reinforced elastomeric layer.

Figure 14:
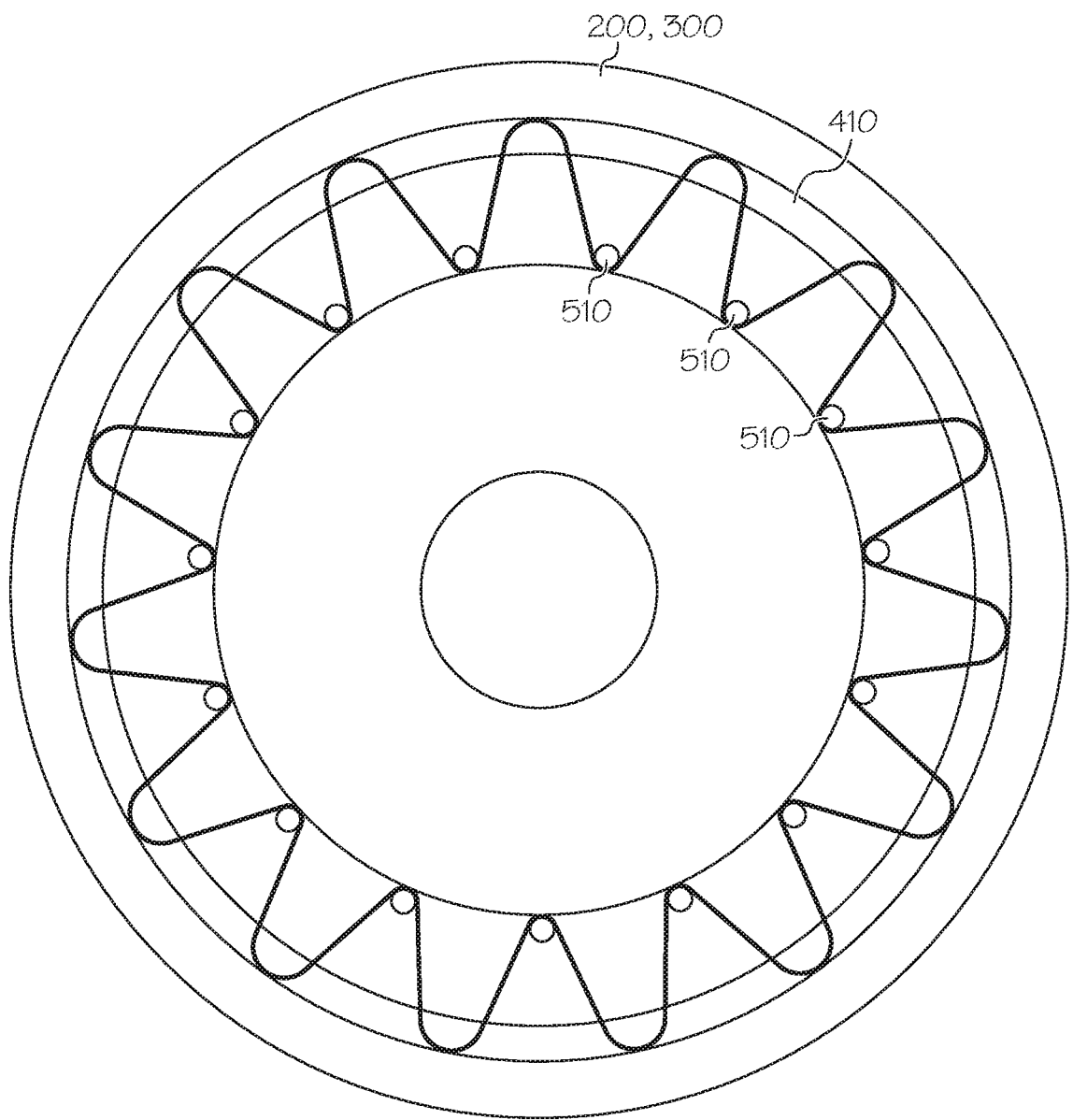
FIG. 14 illustrates the assembly of the tread and shear band subassembly to the wheel.

The shear matrix 330 has a thickness in the range of about 0.10 inches to about 0.2 inches, more preferably about 0.15 inches. The shear matrix is preferably formed of an elastomer material having a shear modulus G in the range of 2.5 to 40 MPa, and more preferably in the range of 20 to 40 MPA. The shear modulus G may be determined using the pure shear test, as shown in FIG. 14.

The shear band has a shear stiffness GA and a bending stiffness EI. It is desirable to maximize the bending stiffness of the shearband EI and minimize the shear band stiffness GA. The acceptable ratio of GA/EI would be between 0.01 and 20, with an ideal range between 0.01 and 5. EA is the extensible stiffness of the shear band, and it is determined experimentally by applying a tensile force and measuring the change in length. The ratio of the EA to EI of the shearband is acceptable in the range of 0.02 to 100 with an ideal range of 1 to 50.

The shear band has a spring rate k that may be determined experimentally by exerting a downward force on a horizontal plate at the top of the shear band and measuring the amount of deflection. The spring rate is determined from the slope of the Force versus deflection curve.

In an alternative embodiment, the shear band may comprise any structure which has the above described ratios of GA/EI, EA/EI and spring rate. The tire tread is preferably wrapped about the shear band and is preferably integrally molded to the shear band.

Spoke Loop Structure

Figure 2:
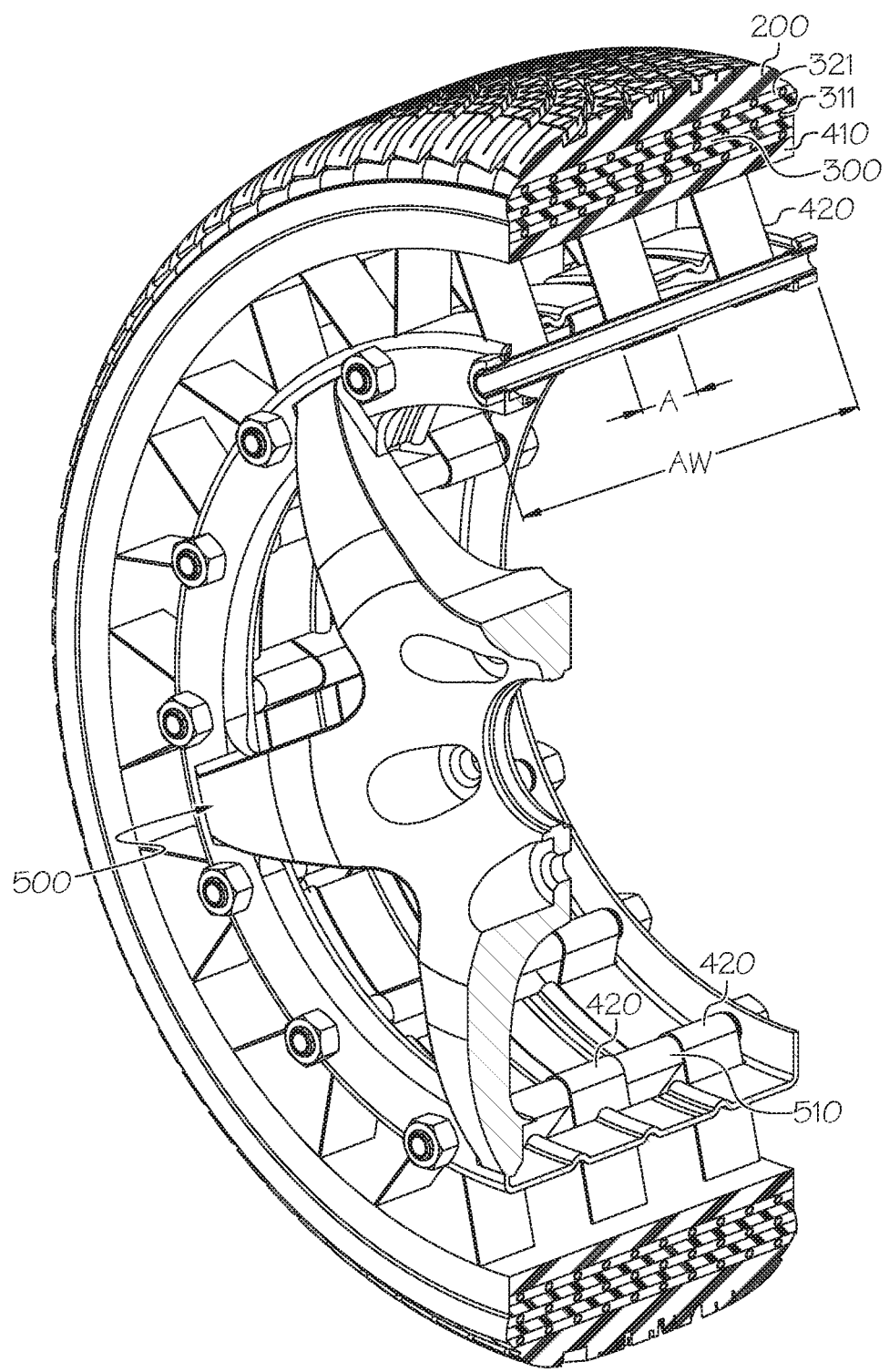
FIG. 2 is a cross-sectional perspective view of the non-pneumatic tire of FIG. 1.
Figure 4:
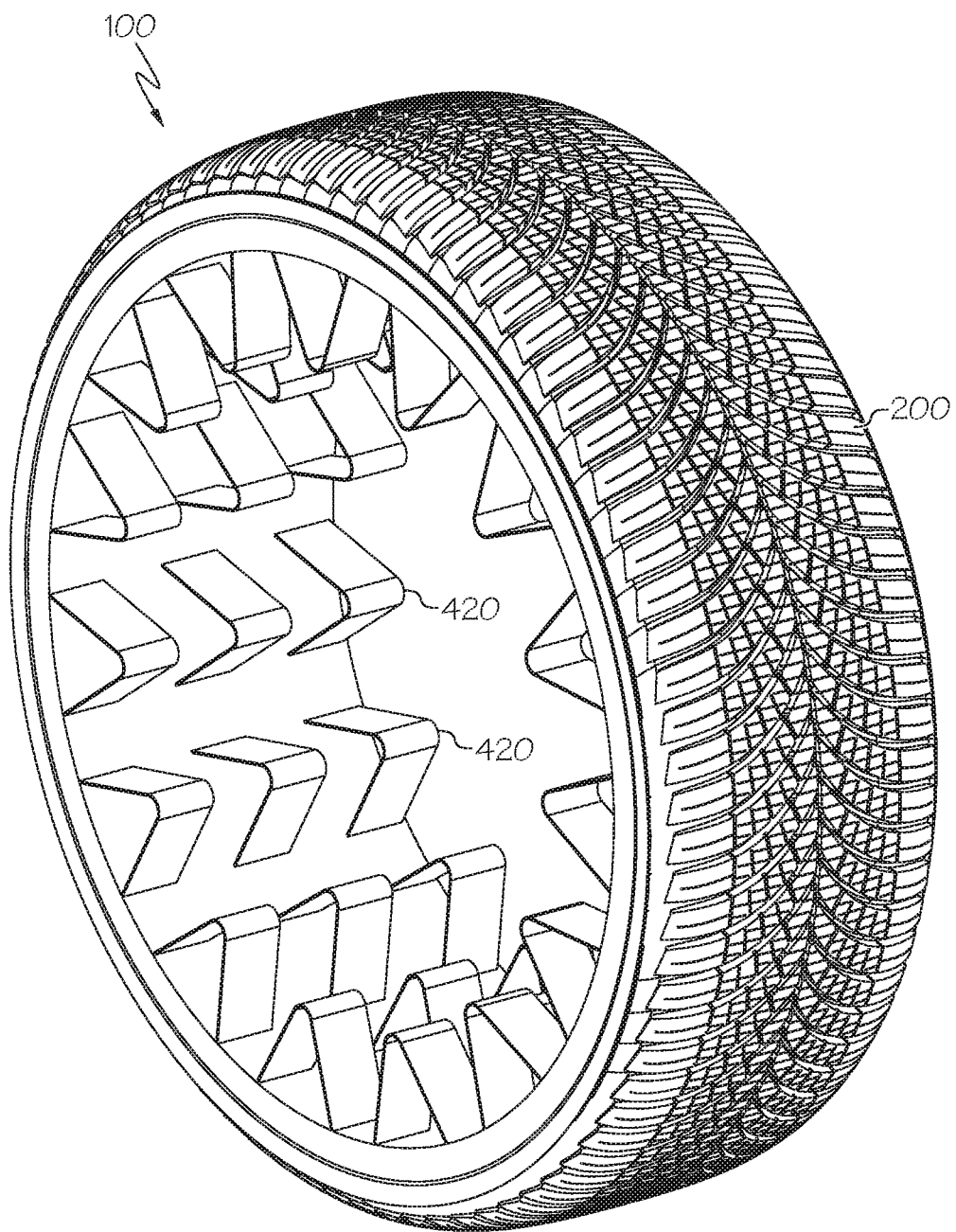
FIG. 4 is a perspective view of the spoke loop structure, shear band and tread ring assembly of the present invention.
Figure 5:
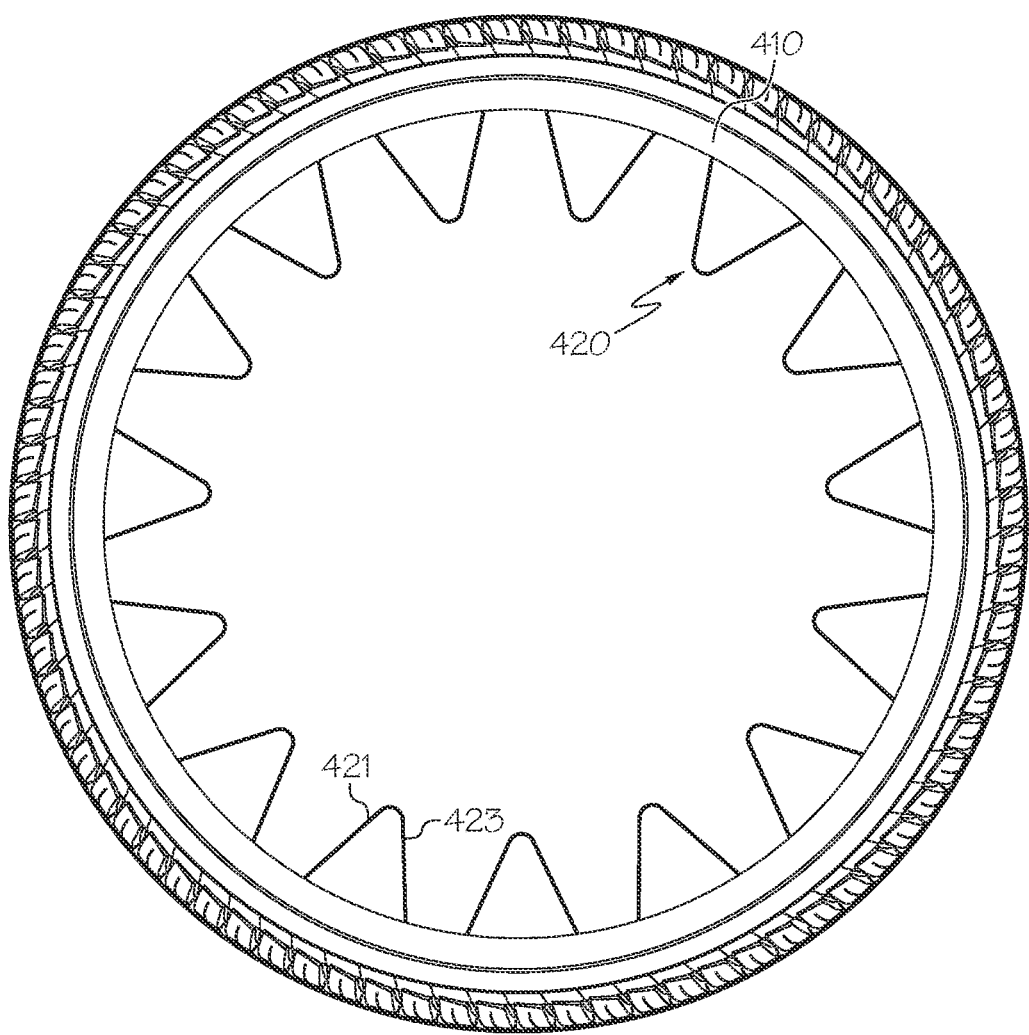
FIG. 5 is a front view of the spoke loop structure of the present invention.
Figure 16:
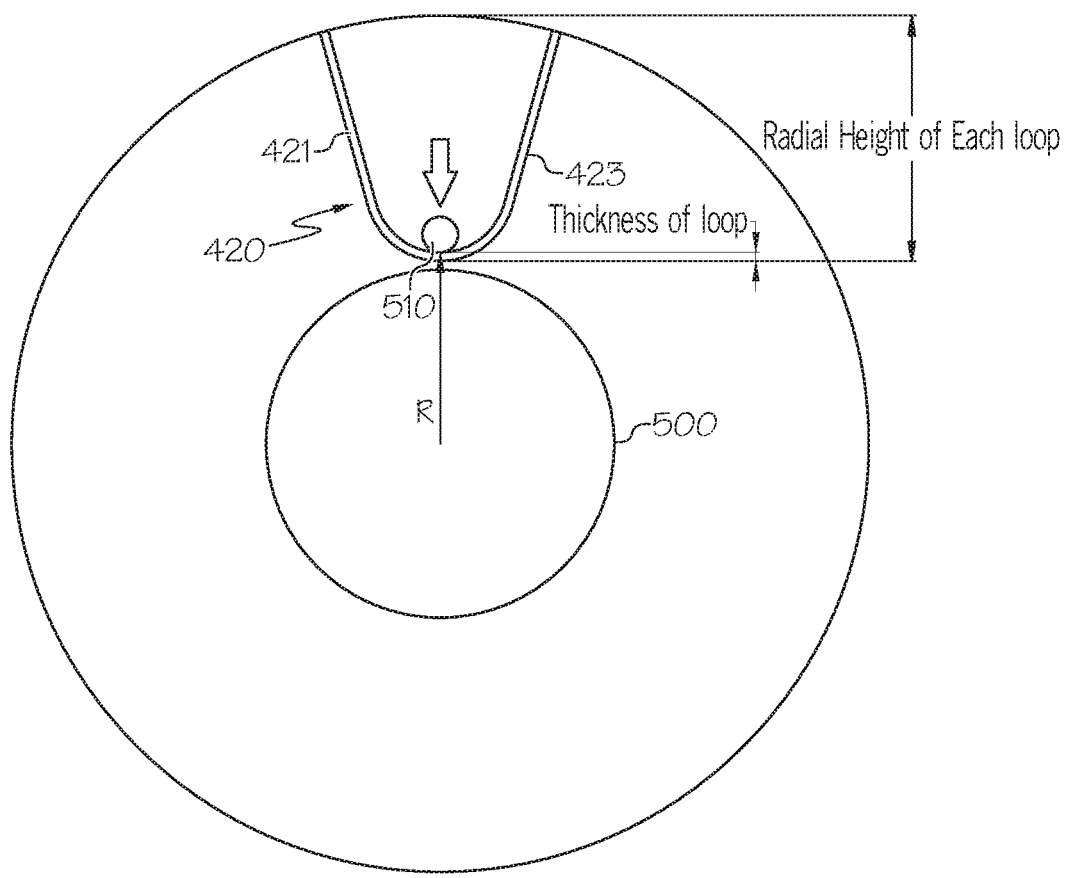
FIG. 16 illustrates how the radial height and thickness of each loop is determined

The non-pneumatic tire of the present invention as shown in FIG. 1 further includes at least one spoke loop structure 400. Each spoke loop structure 400 functions to carry the load transmitted from the shear layer. The spoke loop structures are primarily loaded in tension and shear, and cannot carry any compression load. FIGS. 2 and 4 illustrate an exemplary spoke loop structure 400 having three circumferentially aligned sets of loops 420 which are spaced apart in the axial direction. As shown in FIG. 5, each loop 420 extends inward towards the wheel 500 from an outer annular ring 410. Preferably, each loop 420 is V shaped or triangular in shape. Each loop has a first side 421 and a second side 423, which are not oriented in the radial direction. The radial height of each loop 420 is in the range of 75% to 100% of the nominal radial distance between the inner surface of the shear band and the inner radius R of the pins plus the thickness of the flexible loop shown in FIG. 16. More preferably in the range of 80% to 90%. The loops 420 are spaced apart with a circumferential gap spacing in the range of 1 inch to 5 inches. The circumferential gap spacing may be reduced to increase the number of loops 420. Each loop 420 has radially outer ends which are secured to the outer annular ring 410, which is bonded to the shear band and outer tread structure. Preferably, the radially outer ends are integrally formed with the shear band and tread outer structure. As shown in FIG. 8C, increasing the number of loops also changes the angle of the loop side with respect to the radial direction.

Figure 8A:
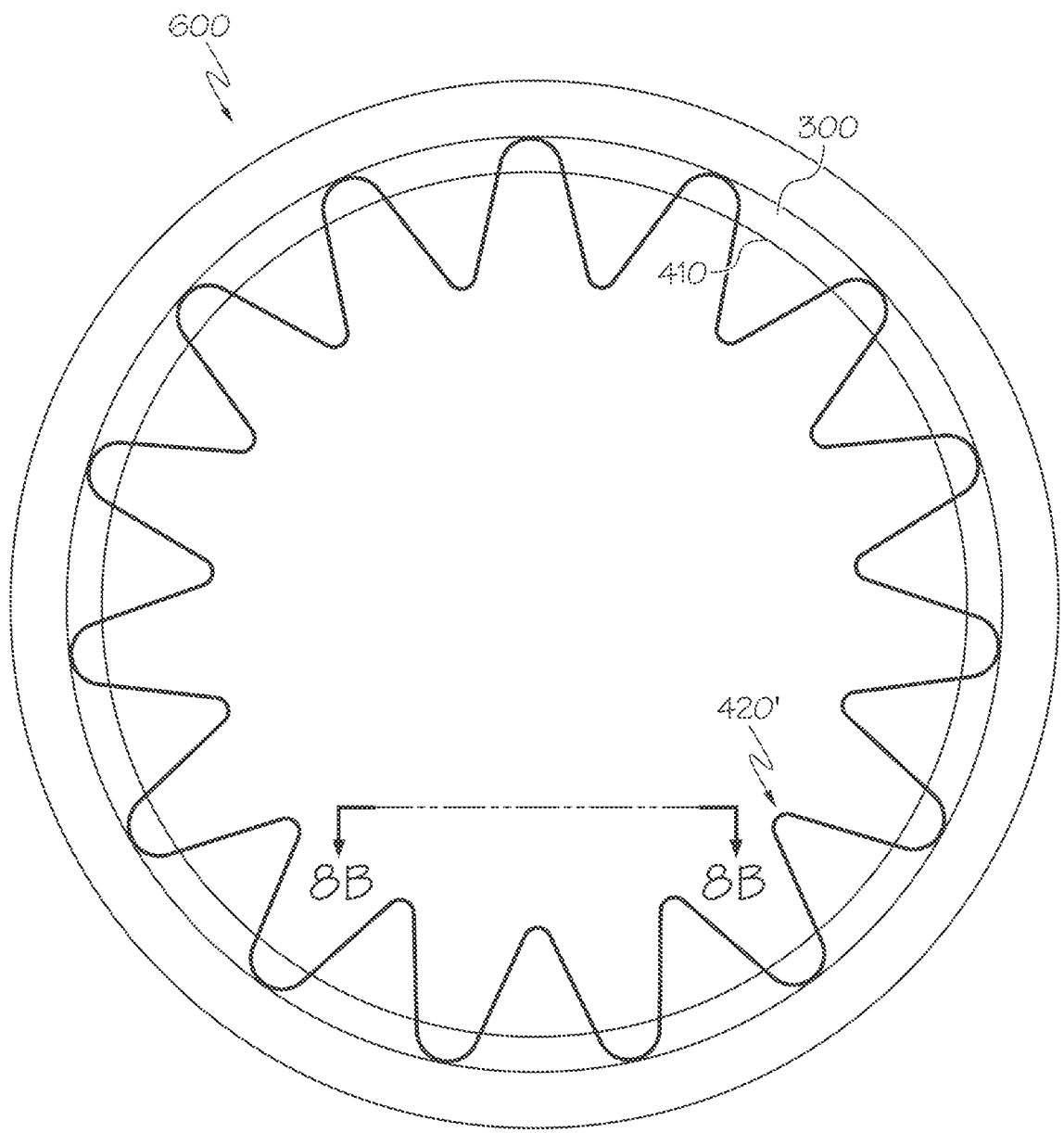

The spoke loop structure may comprise one set of loops as shown in FIG. 8A, and preferably has all of the loops in a set circumferentially aligned. Alternatively, the loops in each set may not be circumferentially aligned.

Figure 8B:
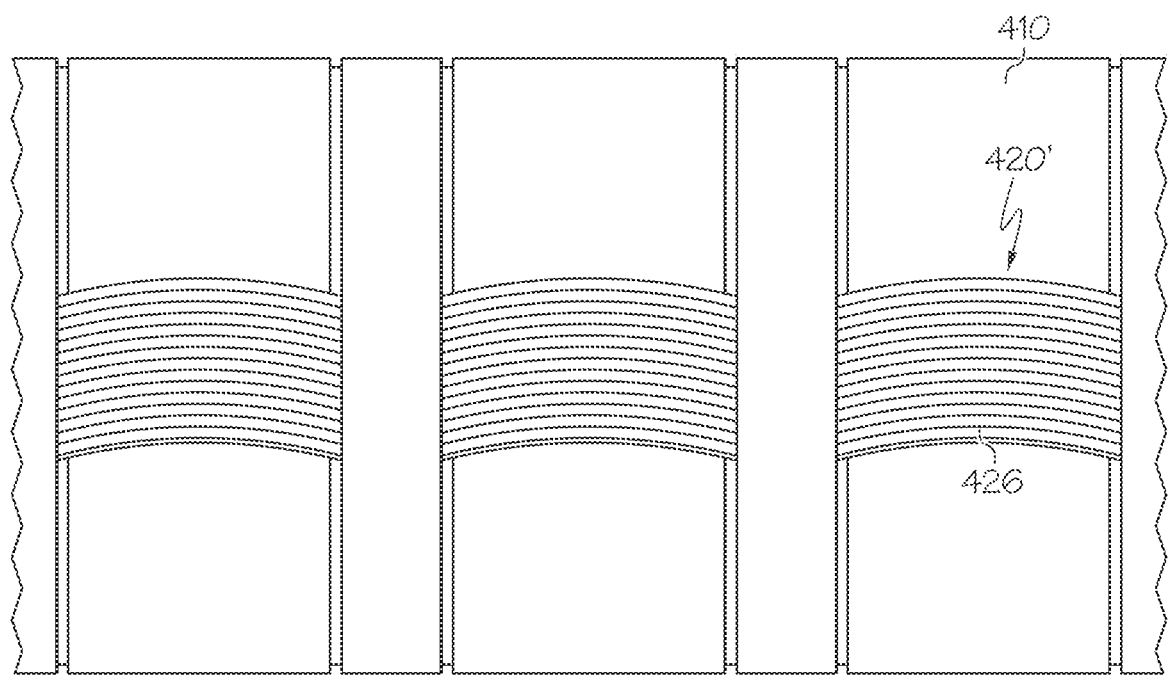
FIG. 8B is a close up view of the spoke loop in the direction 8b-8b of FIG. 8A.
Figure 8C:
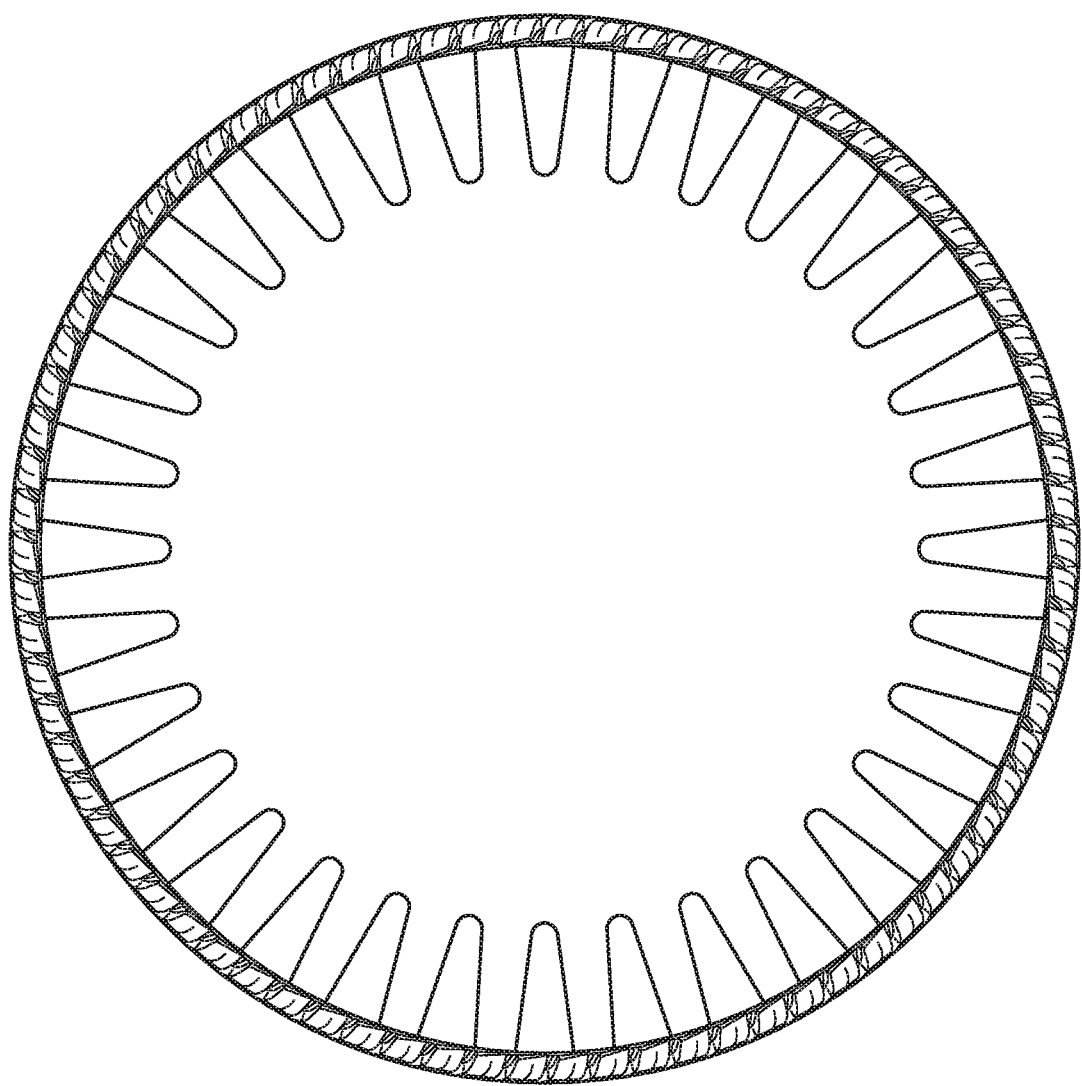
FIG. 8C is a variation of FIG. 8A with more loops.

As shown in FIG. 8B, the loops 420' are preferably formed of a flexible strip 430, preferably a flexible strip of rubber or elastomer, and more preferably, a reinforced elastomer strip with parallel reinforcement cords 426 such as nylon or polyester cords. The reinforcement cords 426 are aligned parallel with respect to each other, and thus when formed in the loop are not radially oriented when assembled. The orientation of the cords 426 in each strip are typically oriented in a direction parallel with the longitudinal axis of the strip, however the cords may also be oriented at an angle $\theta$ in the range of −60 to +60 degrees, and more preferably −45 to +45 degrees with respect to the strip longitudinal axis A. The strip width is typically 0.3 to 2 inches, but may vary as desired. The thickness of the strip or flexible loop is typically 0.04 inches.

Figure 3:
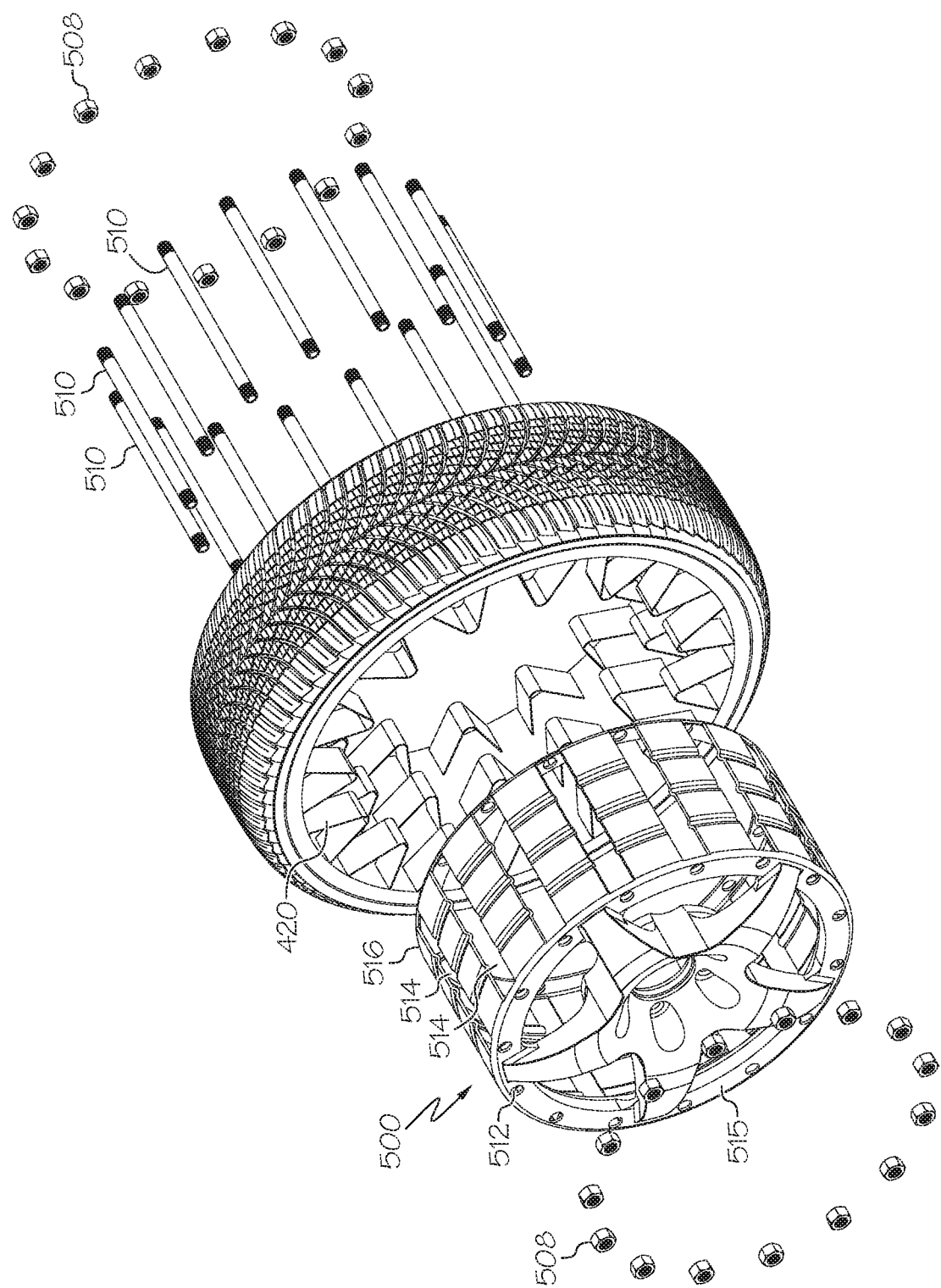
FIG. 3 is an exploded view of non-pneumatic tire of FIG. 1.
Figure 6:
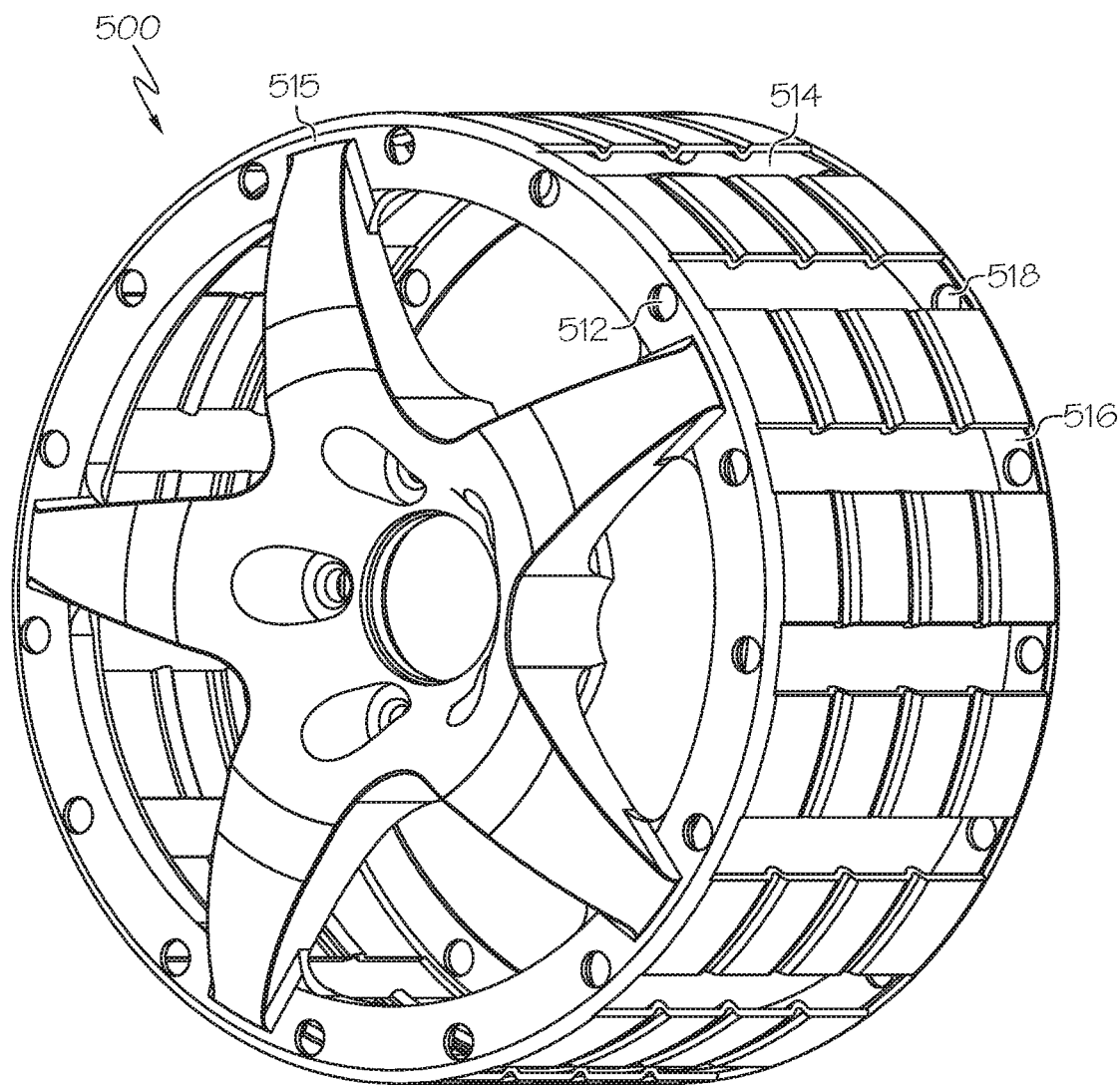
FIG. 6 is a front perspective view of the wheel of the present invention.
Figure 7:
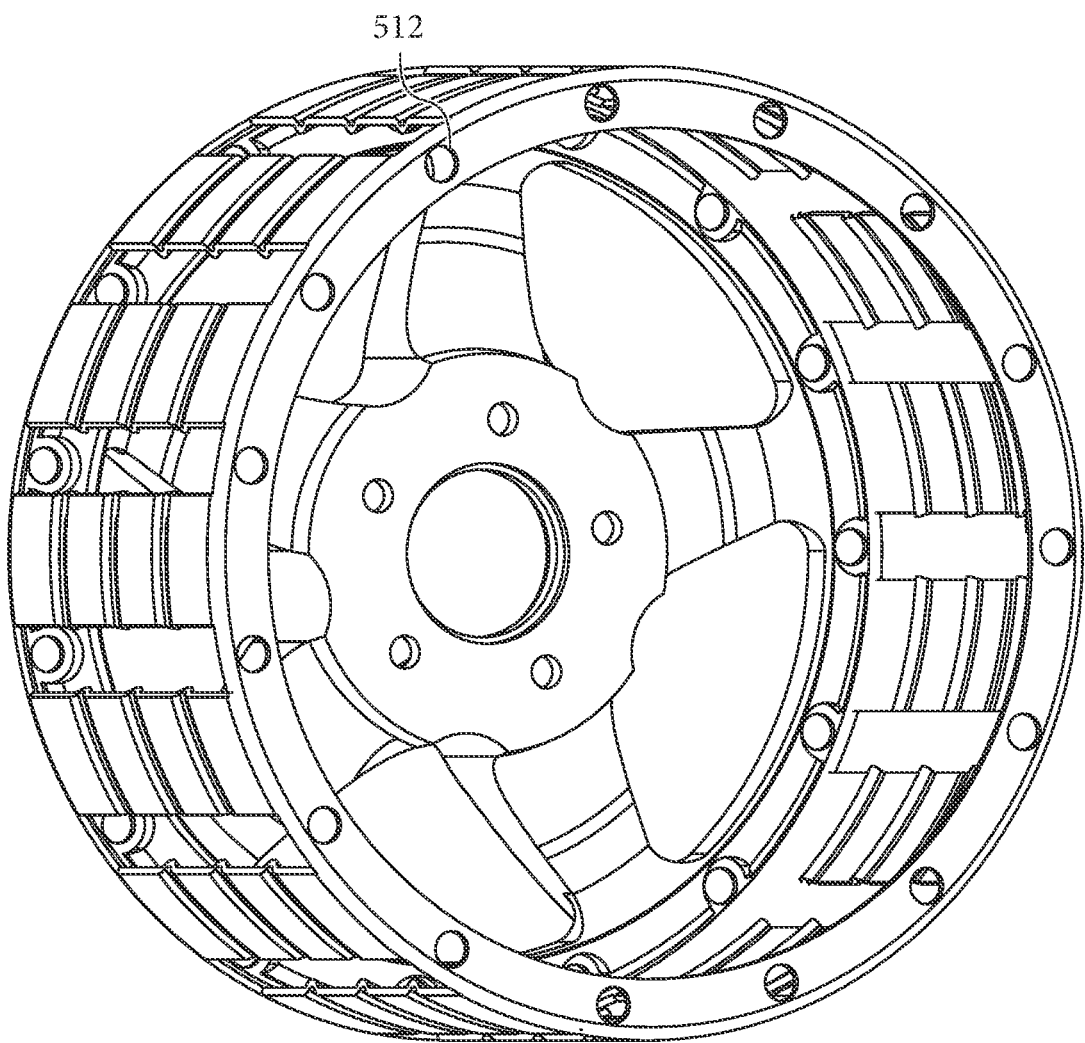
FIG. 7 is a rear perspective view of the wheel of the present invention.

As shown in FIG. 3, each loop 420 of the spoke loop structure is secured to a wheel 500 via locking members, which in this example is a bolt 510 in combination with nuts 508 which are secured to the threaded ends of bolt 510. The locking member may also be a clamp, or pin or other mechanical locking means known to those skilled in the art. Each bolt 510 extends axially across the wheel 500 from a first side 515 to a second side 516, and are secured in holes 512 located on the first side and through hole 518 located on the second side 516, as shown in FIGS. 6-7. The wheel 500 further includes axial slots 514 which provide the needed space for the bolts 510 to be secured to the wheel.

The length of strip used to form each loop may be varied in order to achieve the desired loop pretension. In order to tune the nonpneumatic tire for desired performance characteristics, the spring rate may be varied across the axial width of the tire by varying the stiffness of the cords selected for a set of loops, or by the cord angle orientation. Alternatively, the length of the strips may be varied to vary the pretension of the loops. Each loop set may use a different type of cord or different angle of cords in order to have the desired spring rate of the loops in a given set.

Each loop preferably has an axial width A that is substantially less than the axial width AW of the non-pneumatic tire. The axial width A of each loop is preferably in the range of 5-20% of the tire's axial width AW, and more preferably 5-10% AW. If more than one set of loops are utilized, than the axial thickness of each loop may vary or be the same.

Each spoke loop structure 400 has a spring rate SR which may be determined experimentally by measuring the deflection under a known load. One method for determining the spoke loop structure spring rate k is to mount the spoke loop structure to a hub, and attaching the outer ring of the spoke loop structure to a rigid test fixture. A downward force is applied to the hub, and the displacement of the hub is recorded. The spring rate k is determined from the slope of the force deflection curve. It is preferred that the spoke loop structure spring rate be greater than the spring rate of the shear band. It is preferred that the spoke loop structure spring rate be in the range of 4 to 12 times greater than the spring rate of the shear band, and more preferably in the range of 6 to 10 times greater than the spring rate of the shear band.

If more than one set of spoke loop structure is used, each set may have the same spring rate or a different spring rate. The spring rate of the non-pneumatic tire may be adjusted by increasing the number of spoke loop structures as shown in FIG. 8C. Alternatively, the spring rate of each spoke loop structure may be different by varying the geometry of the spoke loop structure or changing the material. It is additionally preferred that if more than one spoke loop structure is used, that all of the spoke loop structures have the same outer diameter.

Method of Assembly

Figure 12:
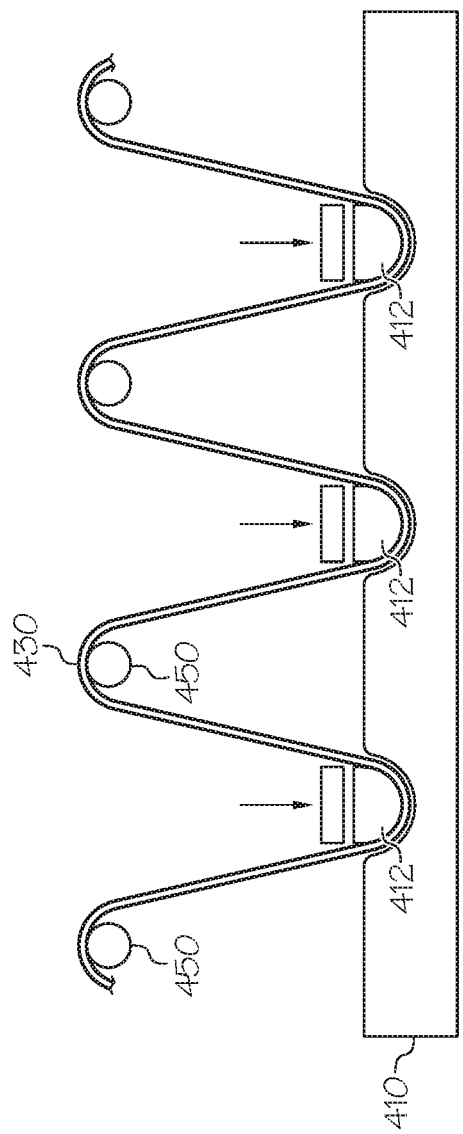
FIG. 12 illustrates the formation of the spoke loop structure.
Figure 13A:
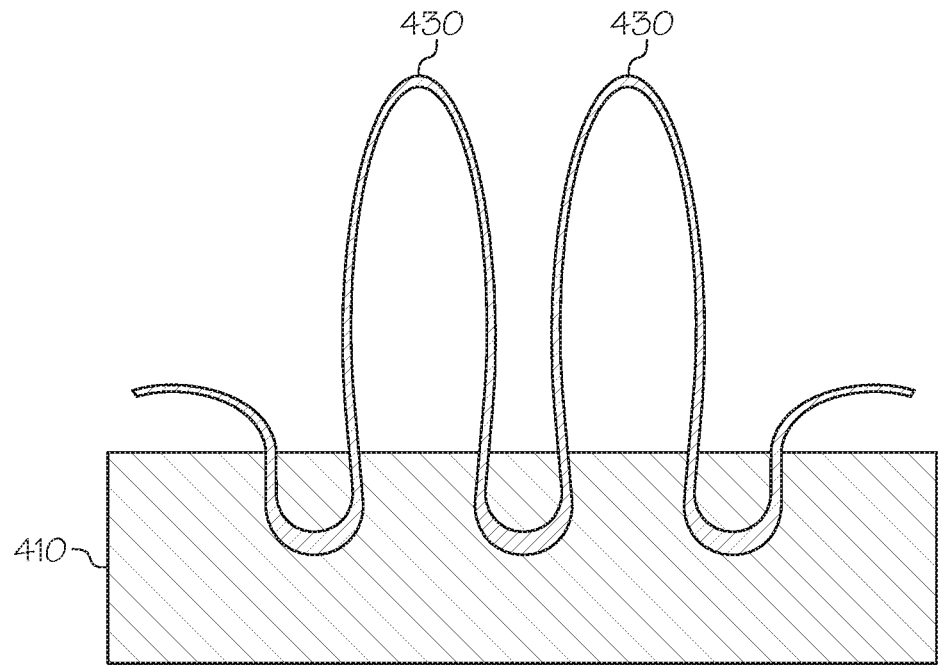
Figure 13B:
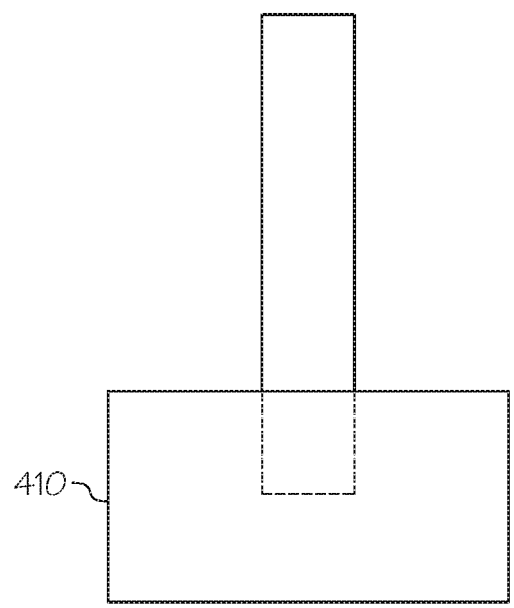
FIG. 13B is a side view of FIG. 13A.

In order to form the spoke structure, the first step is to form the base 410. The base 410 if formed of a strip of rubber having a length equal to the circumference of the shear band, and a width typically equal to or less than the axial width of the tire, and a base depth of about 1-2 inches. The base 410 is preferably extruded. Grooves 412 are formed in the base 410 and are spaced apart from each other a desired distance. Next, a continuous strip of elastomer 430 is used to form the loop structure. The elastomer is preferably a reinforced elastomer, and a portion of the elastomer strip is positioned in a first groove, and then looped around a first pin 450, and then repeated in the same pattern as shown in FIG. 12. The pins are positioned above the base 410 a distance L, which is equal to the desired length of the spoke loop. The length L is carefully controlled so that the loops can be stretched onto the wheel in order to obtain the desired pretension. Gum rubber stock is positioned in each groove over the elastomer strip and then cured using a mold in order to secure the elastomer into the grooves. FIG. 13a illustrates a portion of the spoke loop structure with the flexible loops molded into a base.

After the base with spoke loops is cured flat, it is formed into a circle and positioned radially inward of the shearband and tread ring assembly and then cured in an autoclave. The tread and shearband is separately formed and cured in a mold.

After the shearband and spoke loop assembly is cured, it is mounted on a wheel by threading each loop with a bolt, pin or other locking member which is then secured in the wheel, as shown in FIG. 14.

Figure 15A:
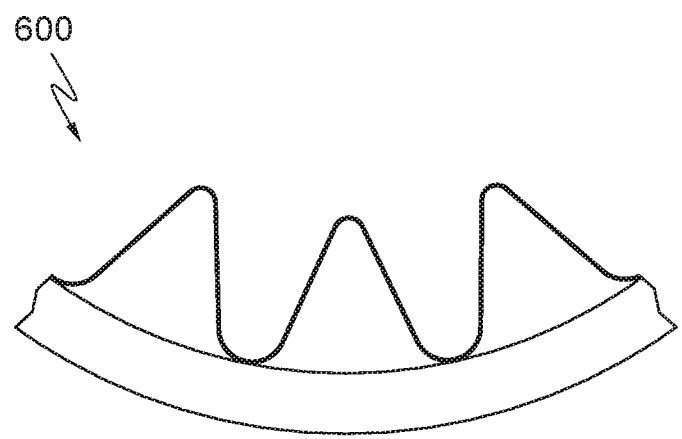
FIGS. 15A and 15B illustrates a first and second embodiment of a spoke sector, respectively.
Figure 15B:
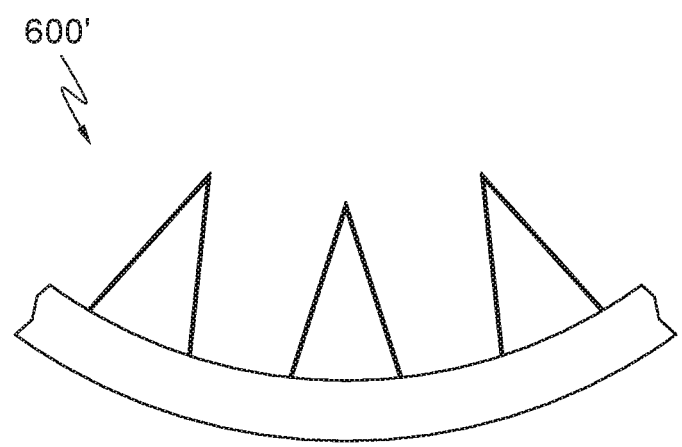

In an alternate embodiment, the spoke loop assembly is formed in sectors 600,600' such as shown in FIG. 15A or 15B. The sectors are formed and then assembled into an annular form when inserted into the shear band. Thus, the base length is selected to be less than the circumference of the shear band. For example, the base length could be one third of the shear band circumference, and there would be three base and loop structures formed which are then inserted into the shear band to form an annular spoke loop assembly. The advantage to forming the spoke loop assembly in multiple parts, is that the spoke loop assembly can be "clocked" such that the spoke loops in one circumferential location are rotationally offset from a second set of spoke loops in a circumferential location, for a structural advantage.

In an alternate embodiment, the loops are formed by cutting strips of elastomer into the desired length and then securing them into a respective groove.

Applicants understand that many other variations are apparent to one of ordinary skill in the art from a reading of the above specification. These variations and other variations are within the spirit and scope of the present invention as defined by the following appended claims.

What is claimed:

1. A non-pneumatic tire and wheel assembly comprising: a ground contacting annular tread portion; a shear band; at least one spoke loop structure connected to the shear band, wherein the spoke loop structure has a first set of flexible loops extending inward from the shear band, wherein each flexible loop is formed from a strip of elastomeric material, and wherein each loop is connected to the wheel, and wherein there is a second set of flexible loops aligned in the circumferential direction, and wherein the second set of flexible loops are reinforced with stiffer reinforcement cords than the first set.

2. The non-pneumatic tire and wheel assembly of claim 1 wherein a pin is received in each flexible loop, and wherein the pin has a first end and a second end, wherein the first and second ends are mounted to the wheel.

3. The non-pneumatic tire and wheel assembly of claim 1 wherein each flexible loop has an axial thickness less than an axial thickness of the non-pneumatic tire.

4. The non-pneumatic tire and wheel assembly of claim 1 wherein at least one loop has a thickness less than its axial width.

5. The non-pneumatic tire and wheel assembly of claim 1 wherein the first set of flexible loops is aligned circumferentially.

6. The non-pneumatic tire and wheel assembly of claim 1 wherein each flexible loop is formed of a strip of elastomer reinforced with a plurality of parallel reinforcement cords.

7. The non-pneumatic tire and wheel assembly of claim 6 wherein the reinforcement cords are aligned with a longitudinal axis of the strip of elastomer.

8. The non-pneumatic tire and wheel assembly of claim 6 wherein the reinforcement cords are angled with respect to a longitudinal axis of the strip of elastomer in the range of 0 to 45 degrees.

9. The non-pneumatic tire and wheel assembly of claim 1 wherein each flexible loop is formed of a strip of elastomer reinforced with a plurality of reinforcement cords aligned in a first and second direction.

10. The non-pneumatic tire and wheel assembly of claim 1 wherein the first set of flexible loops are pretensioned.

11. The non-pneumatic tire and wheel assembly of claim 1 wherein each flexible loop has a side and the side is not oriented in the radial direction.

12. A method of forming a non-pneumatic tire and wheel assembly comprising forming an annular tread portion having a shear band;

forming a base and loop subassembly by providing a base having a plurality of grooves, inserting a layer of elastomer strip into each groove and forming a loop between each of the grooves; and inserting the base and loop subassembly into the shear band so that the base is positioned adjacent the shear band; curing the base and loop subassembly into the shear band; providing a wheel, and then connecting each loop to the wheel, wherein the layer of elastomer strip is continuous, and each loop is formed by looping the strip around a pin.

13. The method of forming a non-pneumatic tire and wheel assembly of claim 12 wherein the base and loop subassembly is formed into an annular structure.

14. The method of forming a non-pneumatic tire and wheel assembly of claim 12 wherein the base and loop subassembly is formed into a sector.

15. The method of forming a non-pneumatic tire and wheel assembly of claim 12 wherein a pin is received in each flexible loop, and wherein the pin has a first end and a second end, wherein the first and second ends are mounted to the wheel.

16. The method of forming a non-pneumatic tire and wheel assembly of claim 12 wherein the loop has an axial thickness less than the axial thickness of the non-pneumatic tire.

17. The method of forming a non-pneumatic tire and wheel assembly of claim 12 wherein a thickness of the loop is less than an axial width of the loop.

18. The method of forming a non-pneumatic tire and wheel assembly of claim 12 wherein the layer of elastomer strip is reinforced with a plurality of parallel reinforcement cords.

19. The method of forming a non-pneumatic tire and wheel assembly of claim 18 wherein the reinforcement cords are aligned with a longitudinal axis of the layer of elastomer strip.

20. The method of forming a non-pneumatic tire and wheel assembly of claim 18 wherein the reinforcement cords are angled with respect to a longitudinal axis of the layer of elastomer strip in the range of 0 to 45 degrees.

21. The method of forming a non-pneumatic tire and wheel assembly of claim 12 wherein each loop is pretensioned.

22. The method of forming a non-pneumatic tire and wheel assembly of claim 12 wherein each loop has a side and the side is not oriented in the radial direction.

* * * * *